United States Patent
Fairchild

(10) Patent No.: US 7,315,235 B1
(45) Date of Patent: Jan. 1, 2008

(54) FIRST WARNING SYSTEM FOR AUTOMOTIVE VEHICLES

(76) Inventor: David Fairchild, 641 Kensington, Ferndale, MI (US) 48220

(*) Notice: Subject to any disclaimer, the term of this patent is extended or adjusted under 35 U.S.C. 154(b) by 126 days.

(21) Appl. No.: 11/107,255

(22) Filed: Apr. 15, 2005

Related U.S. Application Data

(60) Provisional application No. 60/562,390, filed on Apr. 15, 2004.

(51) Int. Cl.
*B60Q 1/00* (2006.01)
*G08B 13/18* (2006.01)

(52) U.S. Cl. .................. 340/425.5; 340/556; 340/557

(58) Field of Classification Search .......... 340/426.33, 340/425.5
See application file for complete search history.

(56) References Cited

U.S. PATENT DOCUMENTS

| 4,084,339 | A | * | 4/1978 | Peltier et al. ............... 40/560 |
| 5,575,550 | A | * | 11/1996 | Appeldorn et al. ......... 362/559 |
| 5,706,107 | A | * | 1/1998 | Smith ........................ 359/15 |
| 5,724,161 | A | * | 3/1998 | Smith et al. ................ 359/13 |
| 2003/0107900 | A1 | * | 6/2003 | Ellison ....................... 362/485 |

* cited by examiner

*Primary Examiner*—Donnie L. Crosland
(74) *Attorney, Agent, or Firm*—Barbara M. Burns

(57) ABSTRACT

A laser-based first warning system for vehicles is principally intended to be used when a vehicle is moving or about to move and can't be seen by oncoming drivers or pedestrians. The first warning system provides lasers on both sides, the front and back of the vehicle to paint a square or other shape on the ground several feet from the hidden vehicle giving warning to anyone that a hidden vehicle is pulling out, or otherwise about to move.

9 Claims, 6 Drawing Sheets

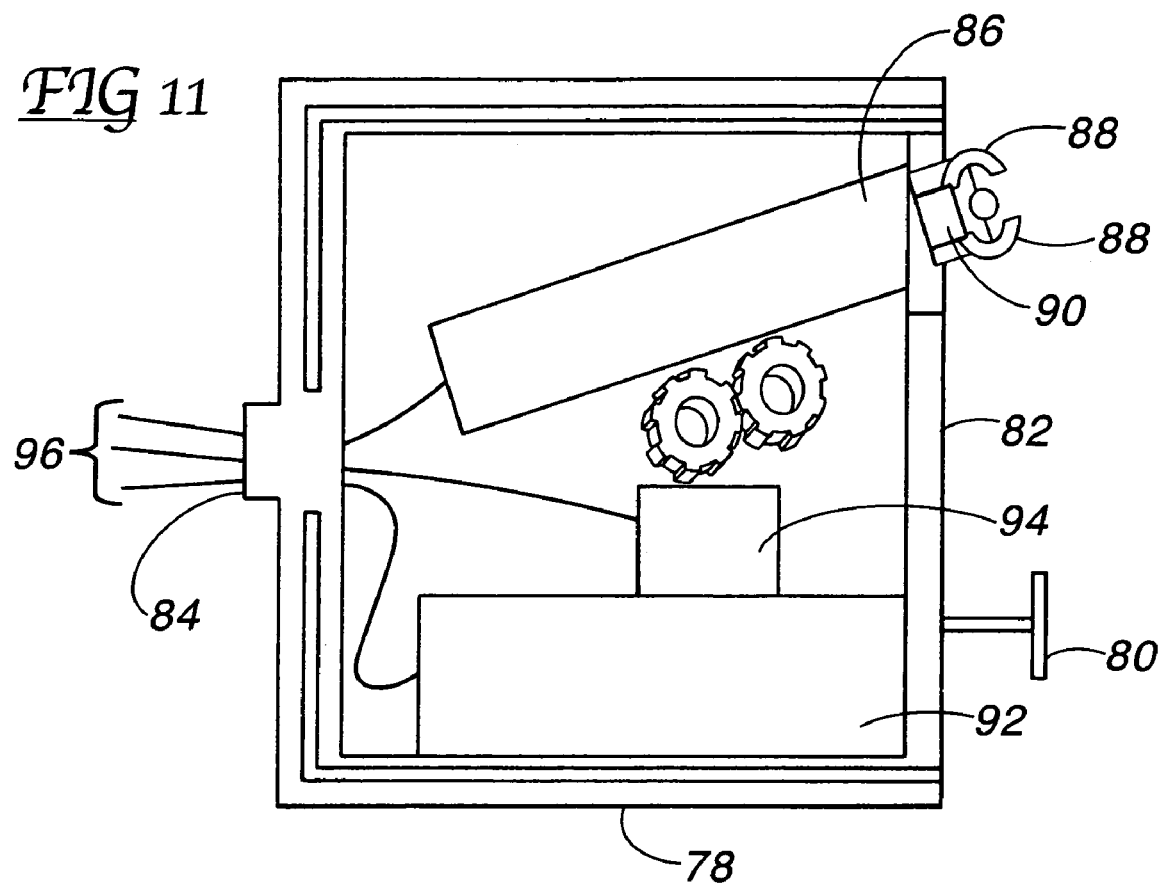

FIRST WARNING SYSTEM FOR AUTOMOTIVE VEHICLES

This application claims the benefit of provisional patent application No. 60/562,390, filed Apr. 15, 2004.

BACKGROUND OF THE INVENTION

The field of the invention pertains to automotive vehicles and, in particular to signaling the presence of a hidden stationary or moving vehicle.

Hidden driveways and alleys present an ever present hazard when a motor vehicle is about to pull out across a sidewalk and into a street carrying ongoing pedestrian or vehicular traffic. There are few things scarier than having to pull out onto a road when the view to the side of the driver is obstructed.

A second hazard caused by obstructed view arises from trucks, buses and SUV's. One of the biggest fears and complaints of truck, bus and SUV drivers is that the high position of the drivers and shape of their vehicles prevents them from seeing any persons or objects that may be within one of the many blind spots that exist on their vehicles. This fear is especially widespread among drivers of trucks that have no rear windows and families with both small children and an SUV or large van.

U.S. Pat. No. 4,859,988 discloses electric circuits for flashing the brake, turn signal and back-up lights in sequence to more readily attract attention to the vehicle. U.S. Pat. No. 4,855,878 discloses vehicle side-mounted back-up lights to provide illumination to both right rear and left rear areas of the vehicles. Depending on the forward location of these side-mounted lights considerable area to each side of the vehicle can't be illuminated.

In contrast to lighting U.S. Pat. No. 5,574,426 discloses a plurality of electronic obstacle detection sensors mounted at the rear of a truck. The driver is signaled the presence and approximate location of an obstacle relative to the truck. U.S. Pat. No. 5,680,101 discloses a forward facing brake light to indicate that a following vehicle is applying its brakes. U.S. Pat. No. 5,769,524 discloses side illumination lights mounted at the front left and right corners of a vehicle for selectively illuminating to the front right and front left of the vehicle.

SUMMARY OF THE INVENTION

The new first warning system is a laser based warning system for vehicles. This system is principally intended to be used when a vehicle is moving or about to move and can't be seen by oncoming drivers or pedestrians. Prior to this system the only warning passing drivers and pedestrians have is the lights on the hidden vehicle and this only at night or in low natural light. In many cases, drivers and pedestrians have no way of seeing these vehicle lights as the hidden vehicle is moving forward. There is no warning for pedestrians and passing traffic which could potentially collide with the hidden vehicle as it emerges. The new first warning system provides lasers on both sides, the front and back of the vehicle. One or more lasers paint a square or other shape on the ground several feet from the hidden vehicle giving warning to anyone that a hidden vehicle is pulling out. To attract more attention the lasers might blink periodically prior to a constant on signal. The laser system is intended to be intuitive in use, either manually or automatically, and includes features to prevent use where not appropriate.

BRIEF DESCRIPTION OF THE DRAWINGS

FIG. 11 depicts internal features of a laser and radar, sonar or lidar unit.

DESCRIPTION OF THE PREFERRED EMBODIMENT

Figure 1:
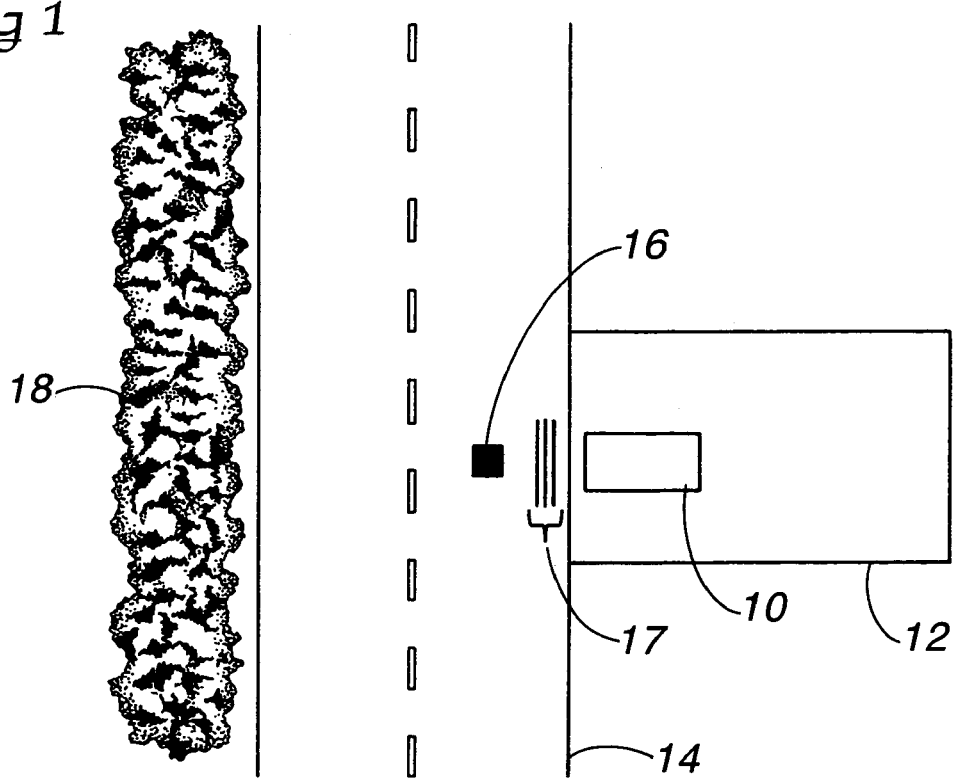
FIG. 1 schematically depicts a vehicle exiting from a driveway onto a highway.

FIG. 1 illustrates a vehicle 10 moving from a driveway or side road 12 into a highway 14 and possible oncoming traffic. To make drivers in oncoming traffic aware of the moving vehicle 10 either a passive or active warning device may be employed. In the passive device a laser affixed to the moving vehicle 10 creates a lighted spot 16 ahead of the vehicle at a fixed distance from the moving vehicle. In a more active system a radar, sonar or lidar device affixed to the moving vehicle 10 measures the distance as indicated by lines 17 to a fixed object such as a tree line 18 on the other side of the highway 14 and takes a proportion of the distance such as one-third to determine the location of the spot 16 from the moving vehicle.

Although oncoming vehicles or pedestrians usually have the right-of-way in these circumstances, seeing the spot 16 warns oncoming drivers or persons of the moving vehicle 10. The warning enables the oncoming drivers to at least place a foot above the brake pedal thus saving about one-half second if the brakes must be applied to prevent a crash.

Figure 2:
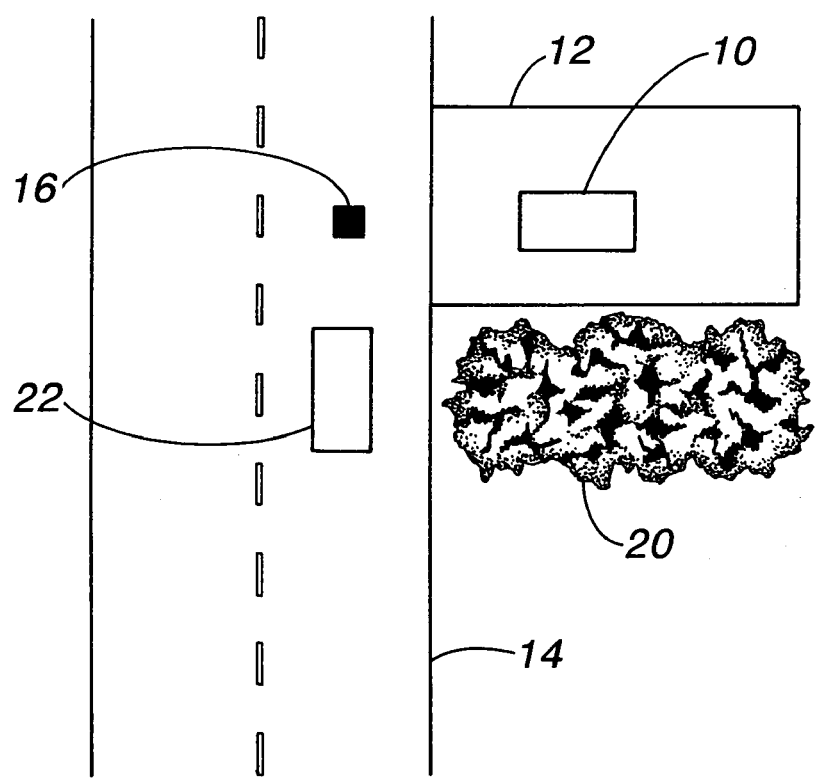
FIG. 2 schematically depicts a vehicle exiting from a blind driveway onto a highway.

As shown in FIG. 2 a tree line 20 or building may completely obscure the moving vehicle 10 from an oncoming vehicle 22. Only the spot 16 enables the oncoming driver in vehicle 22 to realize that a moving vehicle 10 may suddenly exit road or driveway 12 and prepare for the sudden emergence of the vehicle.

Figure 3:
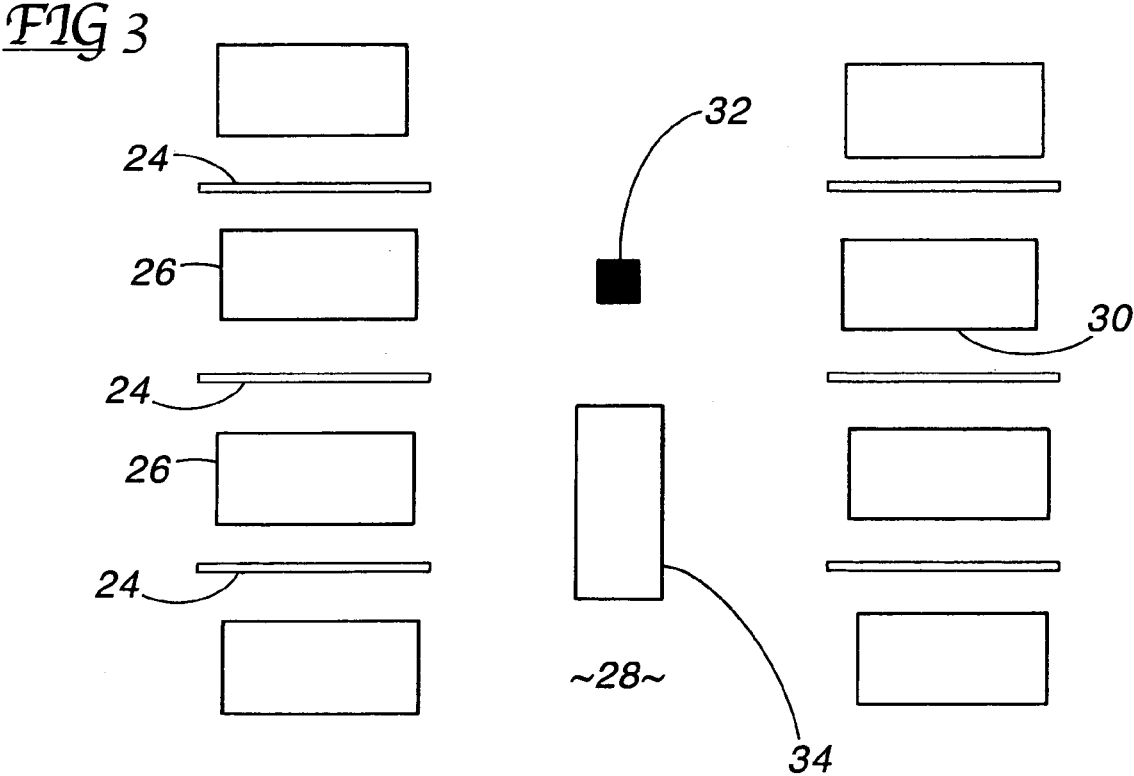
FIG. 3 schematically depicts a vehicle about to exit from a perpendicular parking space.

FIG. 3 depicts a similar situation in a parking lot indicated by lines 24 that is essentially full. A plurality of vehicles 26 are parked perpendicular to the aisle 28. Vehicle 30 is about to move from its parking place into aisle 28 and displays the laser spot 32 enabling the driver of vehicle 34 moving down the aisle to be forewarned. While the speed of vehicle 34 is much slower than on a highway, obstructions such as concrete columns in a parking garage may completely obscure the back-up lights of vehicle 30.

Figure 4:
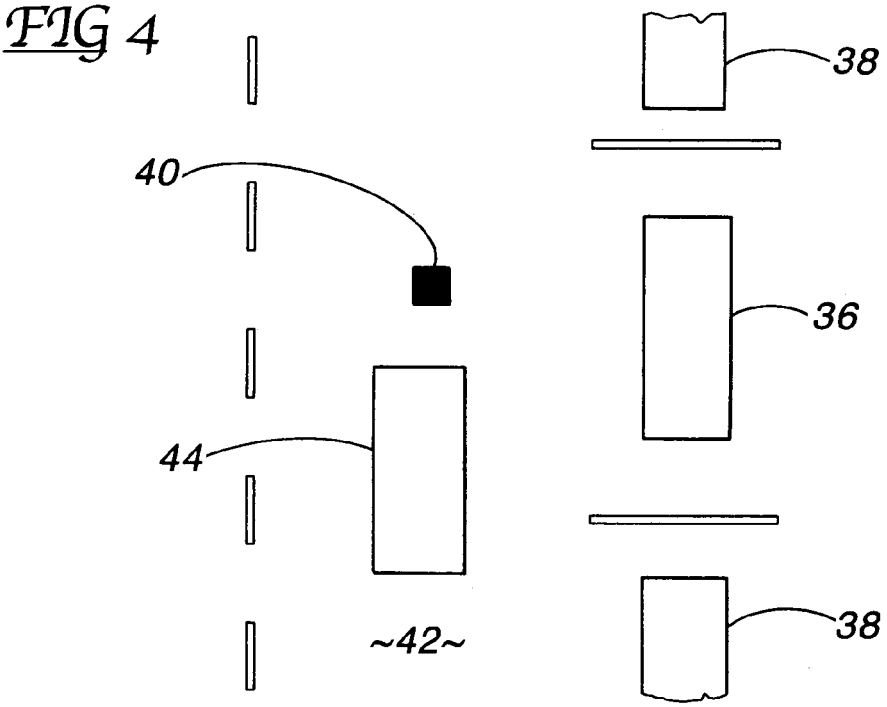
FIG. 4 schematically depicts a vehicle about to exit from a parallel parking space.

FIG. 4 depicts another similar situation where a vehicle 36 is parallel parked between other parked vehicles 38. As the vehicle 36 is about to pull out from its parking space it displays a laser spot 40 in the street 42 to warn the driver of an approaching vehicle 44 that vehicle 36 may suddenly pull out.

Figure 5:
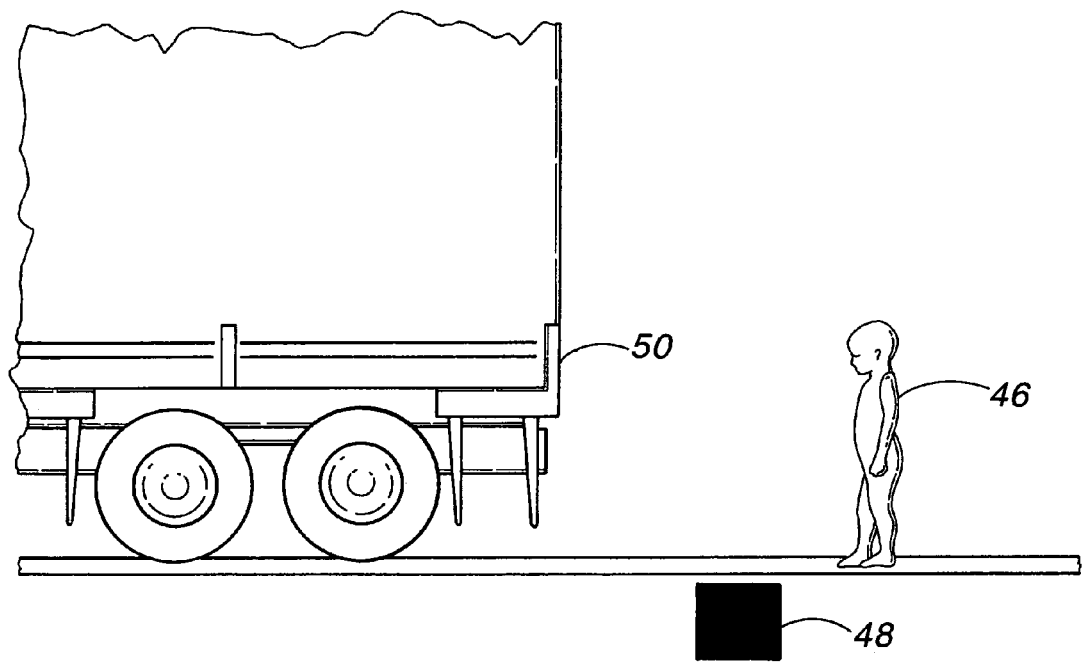
FIG. 5. depicts a child receiving a visual warning from a vehicle about to back-up.
Figure 6:
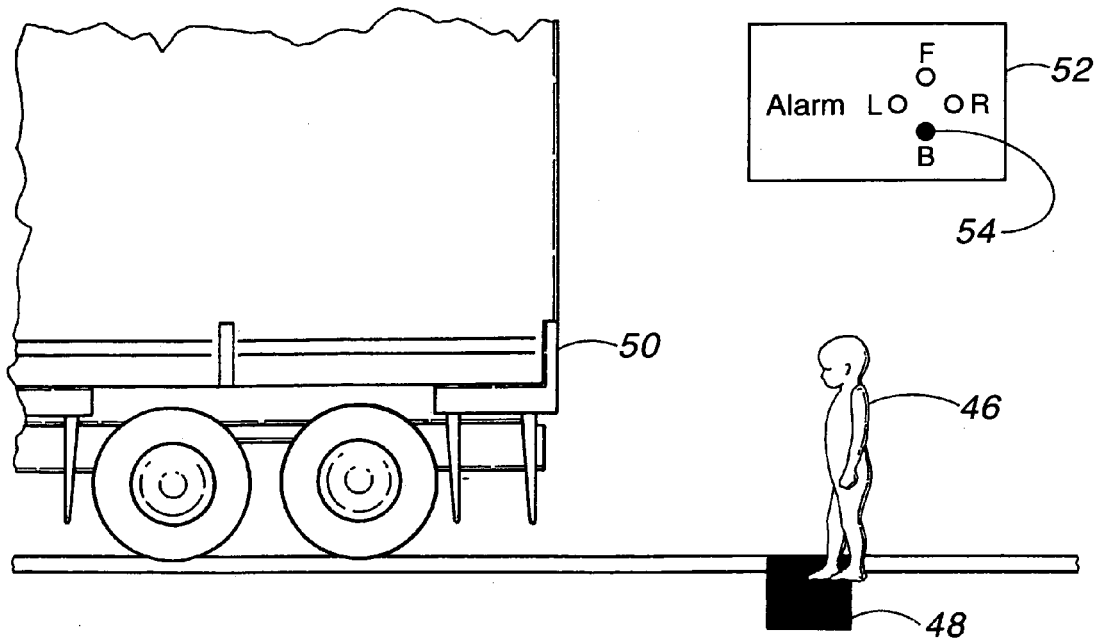
FIG. 6 depicts a child receiving a visual warning from a vehicle about to back-up and a visual alert to the driver.

Illustrated in FIG. 5 is a pedestrian such as a child 46 being warned by a laser spot 48 that a vehicle 50 is backing up. While most commercial vehicles are now equipped with sound warning devices for back-up, deaf persons are not warned. In addition, non-commercial vehicles are generally not equipped with sound warning devices. A more active device utilizes radar, sonar or lidar with the laser spot 48 as shown in FIG. 6. The radar, sonar or lidar can sense the presence of a child 46 and identify the presence of the child by a display 52 to the driver wherein the presence of the child is indicated at 54 by a red light for example. As an additional feature with the use of lidar, the lack of the presence of the spot 48 can be used to warn of the failure of the laser providing the spot.

Figure 7:
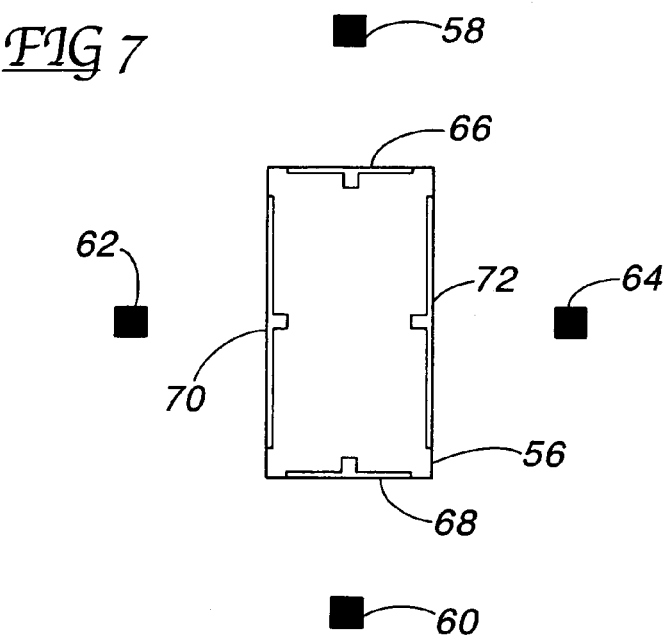
FIG. 7 depicts placement of sensing devices to all sides of the vehicle.

In FIG. 7 a vehicle 56 is schematically shown in plan view. Surrounding the vehicle 56 are four laser spots to the front 58, back 60, left side 62 and right side 64 spaced from the vehicle. The laser spots 50 through 64 are produced by solid state lasers located on the front 66, back 68, left side 70 and right side 72 of the vehicle 56 respectively. The lasers 66 through 72 may be energized selectively by the vehicle driver manually or with some automatic configuration. For example, backing up may automatically energize laser 68, turning the vehicle front wheels to the left may automatically energize laser 70, turning the vehicle front wheels to the right may automatically energize laser 72, but front laser 66 may only be operable manually by the driver. So that the lasers are not turned on under all driving conditions the automatic energization may only occur below a certain speed such as 10 MPH. Likewise, if radar, sonar or lidar is employed to the sides and back of the vehicle 56, actuation may also be limited to speeds below a set limit such as 10 MPH.

Figure 8:
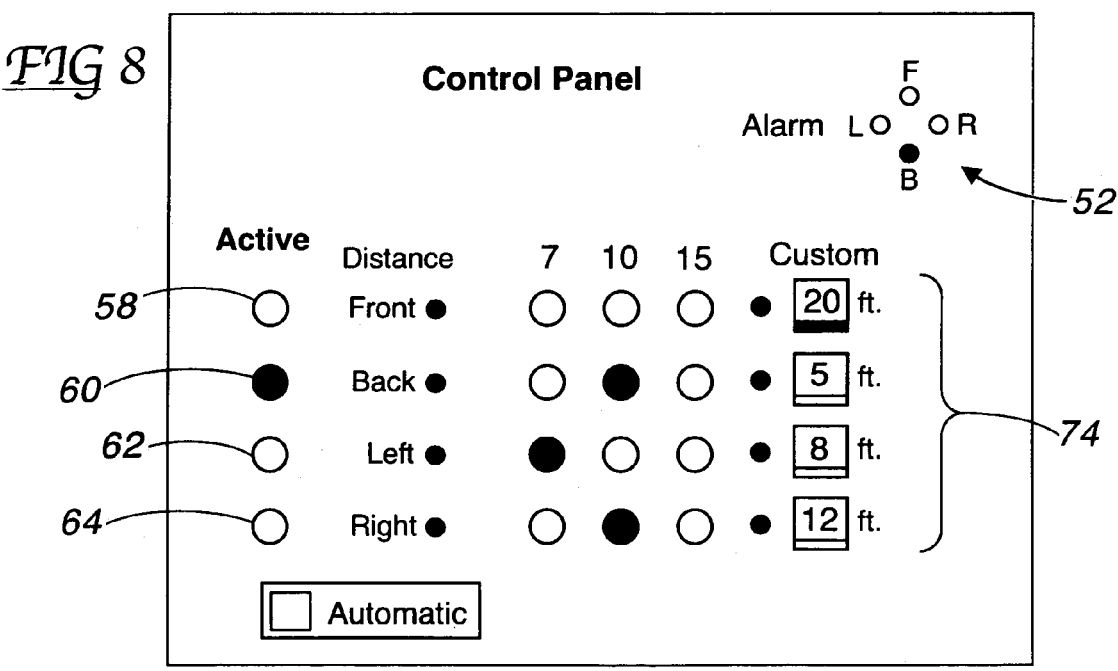
FIG. 8 depicts a simplified control panel for the vehicle driver.
Figure 9:
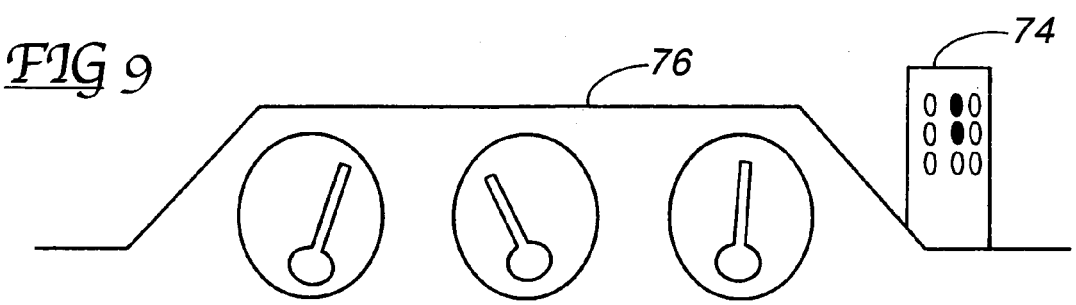
FIG. 9 depicts the placement of the control panel for the driver.

FIG. 8 illustrates a driver control panel generally denoted by 74 and FIG. 9 illustrates a convenient location for the control panel. The control panel 74 lights show the status of the four laser spots 58 through 64. For example, red may indicate active and blue inactive status. Back laser spot 60 is active at 10 feet from the vehicle. Laser spot 58 is set for a custom value of 20 feet but inactive. None of the lasers are set for automatic operation. As shown in FIG. 9 the driver control panel 74 including the alarm display 52, if included, may be positioned above and to the right of the dashboard 76.

Figures 10A, 10B:
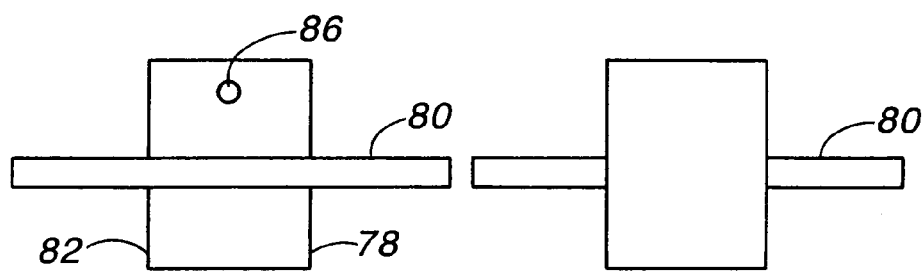
FIGS. 10a, 10b, 10c and 10d depict four external views of a laser and radar, sonar or lidar unit that can be installed on a vehicle.
Figure 10C:
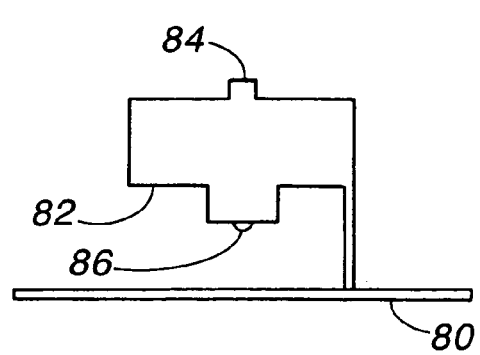
Figure 10D:
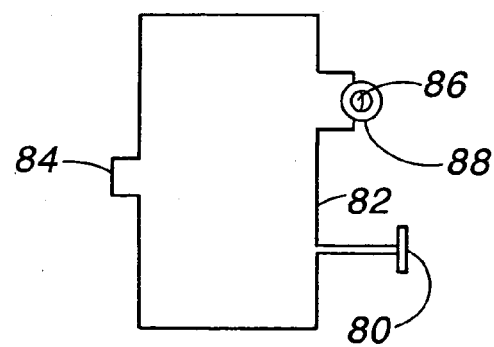

In FIG. 10 an enclosure 78 for the laser and radar, sonar or lidar is shown. The radar or lidar antenna 80 is affixed in front 82 of the enclosure 78 and a port 84 is provided at the back of the enclosure for electric cables to and from the laser and radar, sonar or lidar. From the front 82 of the enclosure 78 extends the laser 86 with a protective cover 88.

As shown in FIG. 11 the enclosure 78 contains the laser 86 with a motor 90 operated cover 88 and a radar, sonar or lidar 92. A second motor 94 raises and lowers the laser 86 to correspond with the distance selected in FIG. 8. The electric cables 96 pass through the port 84 from the motors 90 and 94, laser 86 and the radar, sonar or lidar 92 to a CPU. Whenever a distance is selected in FIG. 8 above, the CPU actuates motor 94 to raise or lower the laser 86. Activation in FIG. 8 opens the cover 88 and energizes the laser 86 and a soft chime to alert the vehicle driver that the laser is operating. The chime will operate until the laser 86 is deactivated.

With the optional settings of 7, 10, 15 or "custom", the vehicle driver can set the laser spot distances from the vehicle for shorter distances in parking lots and longer distances for intersections and highways. Where radar, sonar or lidar is incorporated into the system to detect children or unseen objects, a chime may also sound in addition to a light on the alarm display 52. Although the laser spot is shown in the figures as a square other projected images might be "painted" on the pavement.

On the control panel 74 may be separate switches to activate the lasers, lidar, sonar or radar, or the lights may also serve as push buttons to set the lasers and actuate the lidar, sonar or radar. Activation of the system might be done in several ways.

For example, the driver may set the laser spot distances by pushing the corresponding light buttons and then the active light buttons. The active light buttons can be set for automatic by pressing the automatic button after each active light button as desired.

The actual lasers, lidar, sonar or radar units to produce the signals have not been detailed or their specific locations on the front, back or sides of the vehicle detailed because such units are well known for other purposes and are becoming less expensive and easily protectable from the elements. For example, laser pointers with projected images are well known from classroom demonstrations.

The invention claimed is:

1. Light means on an automotive vehicle adapted to produce at least one directed beam of light of sufficient intensity to paint a spot of light on the ground easily visible in bright daylight, said spot spaced from the vehicle a distance sufficient for viewing by approaching pedestrians or from approaching vehicles, and
   remote sensing means adapted to sense the distance of a remote object from the vehicle and in response control the distance of the spot from the vehicle.

2. The light means on an automotive vehicle of claim 1 wherein the light means and remote sensing means are combined in single units as installed on the vehicle.

3. The light means on an automotive vehicle of claim 1 wherein the remote sensing means is selected from the group consisting of radar, sonar and lidar.

4. The light means on an automotive vehicle of claim 1, including manual means on the vehicle for selecting the distance of the spot from the vehicle.

5. The light means on an automotive vehicle of claim 1 wherein the sensing means controls the direction of the spot relative to the vehicle.

6. The light means on an automotive vehicle of claim 1 wherein the light means comprise a plurality of lasers positioned at a plurality of locations on the vehicle to selectably paint spots about the vehicle.

7. The light means on an automotive vehicle of claim 6, including manual means on the vehicle to selectably paint spots about the vehicle.

8. Light means on an automotive vehicle adapted to produce at least one directed beam of light of sufficient intensity to paint at least one spot of light on the ground easily visible in bright daylight,
   said at least one spot spaced from the vehicle a distance sufficient for viewing by approaching pedestrians or from approaching vehicles,
   said light means comprising a plurality of lasers positioned at a plurality of locations on the vehicle to selectable paint the at least one spot about the vehicle, and
   remote sensing means adapted to sense the distance of a remote object from the vehicle and in response direct the at least one spot toward the object and indicate the presence of the object to the vehicle driver.

9. The light means on an automotive vehicle of claim 8 wherein the light means and remote sensing means are combined in single units as installed on the vehicle.

* * * * *